United States Patent Office 3,231,537
Patented Jan. 25, 1966

3,231,537
SACRIFICIAL ANODE COATING CONTAINING
A FUGITIVE COLORANT
John R. Fisher, Jr., Oakmont, Pa., assignor to Koppers Company, Inc., a corporation of Delaware
No Drawing. Filed Oct. 9, 1963, Ser. No. 314,845
6 Claims. (260—29.6)

This invention relates generally to the protection of ferrous metallic surfaces by cathodic protection. In one specific aspect it relates to an improvement in the method of protecting ferrous metallic surfaces with an inorganic zinc coating by the addition thereto of a fugitive colorant.

Sacrificial anode coatings are widely used to protect iron and steel from corrosion. The sacrificial anode is a metal that is higher in the electromotive series than iron so that in electrochemical reactions this metal becomes the anode and iron the cathode. In such reactions, the anode is sacrificed and the cathode is protected. For example, in galvanized iron rusting is prevented by covering the iron with a layer of zinc.

Zinc dust, because of its cathodic character with respect to iron, if applied as a coating to a ferrous surface, protects the ferrous metal; to some extent the zinc dust acts like galvanizing. Coating the metal with zinc dust together with inorganic binders is described in detail in the copending application of W. E. Kemp, Serial No. 218,861, filed on August 23, 1962. This method of producing sacrificial anode coatings to protect iron and steel from corrosion without the use of electroplating is a considerable step forward in the art.

However, in practical application, the zinc dust coating still suffer from certain deficiencies. In general, when the inorganic zinc coating is applied over a freshly sand blasted metallic surface, it is extremely difficult to distinguish between the zinc coating and the raw metal since both have similar metallic color and lustre. A person applying the coating, therefore, has difficulty in covering the metallic surface completely with a uniform film because it is hard to tell visually where the coating has been applied and where the coating has not been applied. Thus, it is desirable to add a coloring agent to the inorganic zinc coating so that one can readily distinguish between the freshly applied wet coating and the sand blasted metallic surface to which it is applied. This coloring agent must now affect the properties of the final film. For example, the coating in conductive and any pigment which destroys electrical conductivity is undesirable. Further, it is desirable to have the color disappear after a uniform coating has been applied so that the zinc coating reverts to its original metallic color and lustre. Therefore most dyes, which impart permanent color to the coating, are equally undesirable for the purposes of my invention.

Quite surprisingly I have found that an inorganic zinc coating having a transient color can be prepared by incorporation of a small amount of a fugitive colorant to the coating composition. The color is apparent in the wet coating composition but disappears when the wet film dries upon exposure to an air atmosphere. It is thus possible to coat the metallic surface uniformly with a colored inorganic zinc coating and within a short time thereafter the coating will revert to the gray metallic color and lustre.

It is therefore an object of the present invention to provide an inorganic zinc coating containing a colorant which is visible to the naked eye and which colorant disappears within a short period of time.

In accordance with the present invention, I have discovered an improvement in the art of applying a protective coating composition for ferrous metals which composition comprises a sacrificial anode and a binder. The improvement involves the addition of a fugitive colorant to the coating composition. The term fugitive colorant as referred to herein means a colored substance which is apparent in the original mixture and which becomes colorless in the final product.

The fugitive colorants useful in my invention are colored dyes which become colorless on exposure to an air atmosphere. These colorants must be sufficiently visible to the naked eye in the original coating composition, which has a pH of between about 12–14, and must disappear upon exposure of the wet coating to an air atmosphere during drying. Fugitive colorants which are useful in my invention are the triphenylmethane dyes and include specifically the red dyes: dihydroxyphthalophenone, and orthocresophthalein; and the blue dye, thymolphthalein. The amount of dye to be added must be sufficient to impart a discernible color to the coating composition but should not be an excessive amount, in particular, no more than a slight excess of the amount soluble in the aqueous medium should be added. The amount of dye, of course, will vary with the color imparting strength imparted by the dye. The amount of colorant required is generally in the range of 0.1–2.0 parts by weight. The manner of addition of the colorant to the coating composition is relatively unimportant. It may be admixed with the metallic zinc dust, added to the vehicle composition or added separately when the two components are admixed.

The coating composition is composed of two components. The first component, the sacrificial anode, is a pigment selected from the class consisting of zinc dust and powdered binary magnesium-zinc alloy. Zinc dust for use in this invention is a metallic zinc pigment that is commercially available in powdered form. The fine grade should be used. Such fine-grade zinc dust has a maximum particle size of 3 microns and an average particle size of about 2 microns. The binary magnesium-zinc alloy usable in this invention is described more in detail in United States Patent No. 2,877,126. Such binary alloy consists of magnesium in an amount between 30 and 15 weight percent and zinc in an amount between 70 and 85 weight percent. The alloy should be in the form of a particulate powder having a size less than 150 microns and preferably less than 50 microns.

The second component, the binder or vehicle, is kept separate from the first component until ready for use. The second component has the appearance of a colored milky liquid and is comprised of an alkali silicate, an acrylic resin emulsion, fugitive colorant and water.

The alkali silicate may be sodium silicate, potassium silicate, or a mixture of such silicates in the form of an aqueous solution. The alkali silicate solution should be one of those which has a high alkali oxide: silica oxide ratio; the minimum role ratio for potassium silicate ($K_2O:SiO_2$) is 1:3.9 and for sodium silicate ($Na_2O:SiO_2$) is 1:3.75. Such solutions are commercially available, for example, from the Philadelphia Quartz Company as "Kasil No. 1" and "S 35." Such silicates as solids usually comprise about 27 percent by weight of the aqueous medium.

The acrylic resin emulsion is described in detail in United States Patent No. 2,795,564. Such emulsions are the aqueous dispersions of a water-insoluble interpolymer containing a water-soluble non-ionic polyethoxyethanol emulsifying agent and having a pH between 8 and 10. The interpolymer is comprised of: (1) units having carboxylate groups from at least one polymerizable alpha, beta-unsaturated vinylidene carboxylic acid; (2) units from at least one polymerizable ester which by itself forms soft polymers and which is selected from the class consisting of esters of acrylic acid and primary alkanols of 1 to 18 carbon atoms, esters of acrylic acid and secondary alkanols of 1 to 18 carbon atoms, esters of methacrylic acid and primary alkanols of 5 to 18 carbon atoms, esters of methacrylic acid and secondary alkanols of 5 to 18 carbon atoms; and (3) units from at least one polymerizable monovinylidene compound which by itself forms a hard polymer and which is selected from the class consisting of alkyl methacrylates in which the alkyl group has 1 to 4 carbon atoms, tert-amyl methacrylate, tert-butyl acrylate, tert-amyl acrylate, cyclohexyl acrylate, and cyclohexyl methacrylate. The carboxylate units constitute between 0.5 and 2.5 percent of the interpolymer; the proportion of units from the soft polymer-forming ester is sufficient to cause the dispersion of interpolymer to form adhesive and cohesive films at an application temperature of about 35° C.; and the ratio of units from said ester to units from the vinylidene compound is between 9:1 and 1:20.

Typical of the foregoing acrylic resin emulsions are those sold under the trademark "Rhoplex AC–33" and "Rhoplex AC–55." "Rhoplex AC–33," for example, is a milky liquid containing about 46 percent solids; has a viscosity of 60 to 80 ku. at 25° C.; a specific gravity of 1.04 at 25° C.; weighs about 8.67 pounds per gallon; and has a pH of 9 to 9.5. "Rhoplex AC–55" has a solids content of 54 to 55 percent, a specific gravity of 1.08 and a milky liquid appearance.

The range of material for manufacturing the inorganic sacrificial anode zinc coatings containing colorant is (based on 100 percent by weight of the final composition):

Sacrificial anode powder _____ 50–75 percent.
Alkali silicate _____ 10–25 percent (aqueous medium).
Acrylic resin emulsion _____ 2–10 percent (aqueous medium).
Fugitive colorant _____ 0.1–2.0 percent.
Water _____ To adjust the viscosity for the mode of application.

The proportion within the above limits is critical. For example, it has been found that if the proportion of anode metal be too little, the metal-to-metal contact, i.e., anode to anode particle and anode particle to iron, is not sufficient; but if the proportion be too great, not enough binder is present to hold the anode particles together or to the cathode metal. It has also been found that the higher the ratio of the silicon dioxide to alkali metal oxide in the alkali silicate, the better is the material. It has further been found that if the proportions of alkali silicate and acrylic resin emulsion are not within the foregoing limits, the material does not adhere well to the surface, becomes brittle and spalls and may even become water-sensitive.

A typical composition may be made, for example, by mixing 75 parts of zinc dust with 10 parts of a 27 percent aqueous potassium silicate medium, 2 parts of a 46 percent solids aqueous acrylate resin emulsion, 1.0 part of dihydroxyphthalophenone, and 13 parts of water. Another composition could involve 50 parts of zinc dust with 25 parts of a 27 percent aqueous potassium silicate medium, 10 parts of a 46 percent solids aqueous acrylate resin emulsion, 1.0 part of dihydroxyphthalophenone, and 15 parts of water.

Until ready for use, each component of the composition is kept in a separate container, one container for the anode particle, the other container for the binder. The two components are then mixed; and the mixture is applied to metal in a conventional manner to coat the metal with a film which has a transient color but soon changes to a light gray film. The composition is particularly advantageous for spray coating. It should be used within three hours after the components are mixed as some attack starts on the anode particles after this time and some hydrogen seems to be evolved.

The coating film preferably should be one coat that is advantageously less than 5 mil and preferably about 2–3 mil in thickness. At the time of application, the difference between the coated and uncoated surfaces is visually apparent. The dried coating film is light gray in color and will contain between about 96–87 percent of sacrificial anode metal, 2–8 percent of alkali-metal silicate, and 1–5 percent of acrylic resin. If desired, the novel coating of this invention may be overcoated with any alkali-resistant organic coating such, for example, as those having epoxide, urethane and chlorinated rubber bases.

The following examples will further illustrate the benefits and advantages obtained by this invention:

*Example I*

The binder component is made by mixing 15.1 parts of potassium silicate having a molecular ratio $K_2O:SiO_2$ of 1:3.9 (Kasil No. 1) with 5.6 parts of an acrylic resin emulsion ("Rhoplex AC–33") 0.5 part of dihydroxyphthalophenone and 11.3 parts of water. With this binder is then mixed 60 parts of zinc dust having an average particle size of 2 microns. This, then, provides a hundred parts of coating composition. The coating composition is sprayed on sheets of grease-free mild steel to a film thickness of 3 mils to give a uniform pink appearance. The coating, which dries to touch in ten minutes and becomes water-insoluble in fifteen to thirty minutes, has a colorless appearance.

The coating composition was applied to a mild steel surface at the rate of one gallon per 400 square feet to give a resulting film of approximately 3 mils in thickness. The amount of zinc present was then roughly about one ounce per square foot. A specimen of this coated surface was compared with a specimen of a commercial galvanized sheet of steel having zinc galvanized thereon at the rate of aobut one ounce per square foot. The surfaces of both specimens were scratched to a scar a width of 1/32 of an inch. After 1000 hours exposure in a Standard ASTM Salt-Fog-Cabinet, the galvanized specimen exhibited gross rusting in the scar mark, whereas the specimen with inorganic coating of this invention showed no rusting. In fact, the corrosion products resulting from the coating of this invention tended to heal the scratch by decomposition of a grayish-white zinc oxide-silicate-matrix thus preventing further electrical drain on the anode metal.

*Example II*

A composition made in accordance with Example I, except substituting 0.5 part of ortho-cresolphthalein, was sprayed on a sheet of grease-free mild steel to give a uniform coating of a red color which gradually disappeared on drying.

*Example III*

A composition made in accordance with Example I, except substituting 0.5 part of thymolphthalein; was sprayed on a sheet of grease-free mild steel to give a uniform coating of a blue color which gradually disappeared on drying.

The foregoing has presented a novel method of applying a uniform coat of sacrificial anode type coating which can be applied to a ferrous metal surface without special treatment of the surface; the coating adheres well to the surface, is flexible, is temperature and chemical resistant and provides excellent long-time protection for the surface.

I claim:

1. A coating composition for the protection of a ferrous metal surface comprising an admixture based upon 100 percent by weight of the coating composition of 50–75 percent by weight of an anode metal powder selected from the class consisting of zinc dust and magnesium-zinc alloy particles having between 70 and 85 weight percent of zinc and between 30 and 15 weight percent of magnesium; a binder consisting essentially of 10 to 25 percent of an alkali silicate solution, 2 to 10 percent of an acrylic resin emulsion wherein the resin is an interpolymer comprised of: (1) units having carboxylate groups from at least one polymerizable alpha, beta-unsaturated vinylidene carboxylic acid, (2) units from at least one polymerizable ester which by itself forms soft polymers and which is selected from the class consisting of esters of acrylic acid and primary alkanols of 1 to 18 carbon atoms, esters of acrylic acid and secondary alkanols of 1 to 18 carbon atoms, esters of methacrylic acid and primary alkanols of 5 to 18 carbon atoms, esters of methacrylic acid and secondary alkanols of 5 to 18 carbon atoms, and (3) units from at least one polymerizable monovinylidene compound which by itself forms a hard polymer and which is selected from the class consisting of alkyl methacrylates in which the alkyl group has 1 to 4 carbon atoms, tert-amyl methacrylate, tert-butyl acrylate, tert-amyl acrylate, cyclohexyl acrylate, and cyclohexyl methacrylate with the carboxylate units constituting between 0.5 to 2.5% of the interpolymer and the proportion of units from the soft polymer-forming ester being sufficient to cause the dispersion of interpolymer to form adhesive and cohesive films at an application temperature of about 35° C. and the ratio of units from said ester to units from the vinylidene compound being between 9:1 and 1:20, and sufficient water to adjust the viscosity to that desired for the mode of application of the coating to the surface; and a fugitive triphenylmethane colorant in an amount between 0.1 and 2.0 percent sufficient to impart a discernible color to the coating composition, said colorant becoming colorless upon extended exposure.

2. A coating composition according to claim 1 wherein said fugitive triphenylmethane colorant is a member selected from the group consisting of dihydroxyphthalophenone, ortho-cresolphthalein, and thymolphthalein.

3. A coating composition according to claim 1 wherein said fugitive triphenylmethane colorant is dihydroxyphthalophenone.

4. A coating composition according to claim 1 wherein said fugitive triphenylmethane colorant is ortho-cresolphthalein.

5. A coating composition according to claim 1 wherein said fugitive triphenylmethane colorant is thymolphthalein.

6. A method of protecting a ferrous metal surface which comprises admixing on the basis of 100 percent by weight of the admixture between 50 and 75 percent by weight of an anode metal powder selected from the class consisting of zinc dust and magnesium-zinc alloy particles having between 70 and 85 weight percent of zinc and between 30 and 15 weight percent of magnesium with a binder consisting essentially of 10 to 25 percent of an alkali metal silicate solution, 2 to 10 percent of an acrylic resin emulsion wherein the resin is an interpolymer comprised of: (1) units having carboxylate groups from at least one polymerizable alpha, beta-unsaturated vinylidene carboxylic acid, (2) units from at least one polymerizable ester which by itself forms soft polymers and which is selected from the class consisting of esters of acrylic acid and primary alkanols of 1 to 18 carbon atoms, esters of acrylic acid and secondary alkanols of 1 to 18 carbon atoms, esters of methacrylic acid and primary alkanols of 5 to 18 carbon atoms, esters of methacrylic acid and secondary alkanols of 5 to 18 carbon atoms, and (3) units from at least one polymerizable monovinylidene compound which by itself forms a hard polymer and which is selected from the class consisting of alkyl methacrylates in which the alkyl group has 1 to 4 carbon atoms, tert-amyl methacrylate, tert-butyl acrylate, tert-amyl acrylate, cyclohexyl acrylate, and cyclohexyl methacrylate with the carboxylate units constituting between 0.5 and 2.5% of the interpolymer and the proportion of units from the soft polymer-forming ester being sufficient to cause the dispersion of interpolymer to form adhesive and cohesive films at an application temperature of about 35° C. and the ratio of units from said ester to units from the vinylidene compound being between 9:1 and 1:20, sufficient distilled water to adjust the viscosity to that desired, and 0.1 to 2 percent of a fugitive triphenylmethane colorant selected from the group consisting of dihydroxyphthalophenone, ortho-cresolphthalein, and thymolphthalein, and applying said admixture to said ferrous metal surface whereby the admixture dries to a film containing between 96–87 percent of anode metal, 2–8 percent of alkali metal silicate and 1–5 percent of acrylic resin.

References Cited by the Examiner
UNITED STATES PATENTS

| | | | |
|---|---|---|---|
| 2,930,771 | 3/1960 | Wade | 260—29.6 |
| 2,946,695 | 7/1960 | Dietz et al. | 260—29.6 |
| 3,053,693 | 9/1962 | Schuster et al. | 106—14 |
| 3,093,493 | 6/1963 | Von Freyhold | 106—84 |

FOREIGN PATENTS

| | | |
|---|---|---|
| 1,062,856 | 8/1959 | Germany. |

MURRAY TILLMAN, *Primary Examiner.*

W. J. BRIGGS, SR., *Assistant Examiner.*